No. 613,528. Patented Nov. 1, 1898.
F. G. RICHMOND.
APPARATUS FOR PRESERVING FISH ALIVE DURING TRANSPORTATION.
(Application filed Dec. 31, 1897.)
(No Model.)

UNITED STATES PATENT OFFICE.

FRANCIS G. RICHMOND, OF BRAUNTON, ENGLAND.

APPARATUS FOR PRESERVING FISH ALIVE DURING TRANSPORTATION.

SPECIFICATION forming part of Letters Patent No. 613,528, dated November 1, 1898.

Application filed December 31, 1897. Serial No. 664,966. (No model.)

*To all whom it may concern:*

Be it known that I, FRANCIS GEORGE RICHMOND, a citizen of England, residing at Buckland Fishery, Braunton, North Devon, England, have invented a certain new and useful Method of Preserving Fish Alive During Transportation and Apparatus for that Purpose, (for which I have obtained a patent in England, dated June 2, 1897, No. 13,578,) of which the following is a specification.

My invention relates to a method of preserving fish alive during transportation by supplying oxygen to the water in which they are carried and to apparatus for this purpose, as I shall describe with reference to the accompanying drawings.

The method consists, essentially, in filling the compartment or compartments in a fish-receptacle with free oxygen, which is in free communication with the air, and by which the oxygen is absorbed by mere contact with the air, especially when agitated during transportation of the vessel.

The shape of the apparatus may be varied without departing from the scope of my invention, and the accompanying drawings illustrate a simple and efficient form of apparatus, and wherein—

Figure 1:
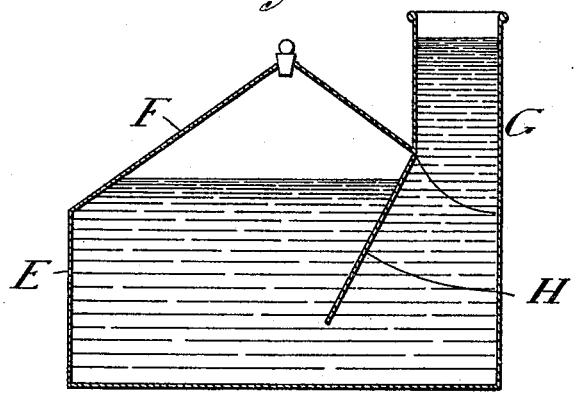
Figure 2:
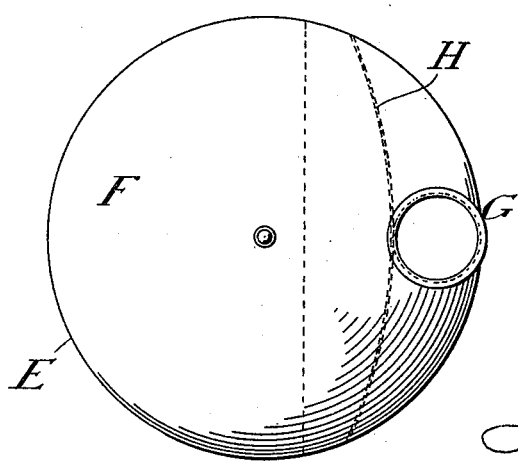

Figure 1 is a vertical section through a transporting vessel constructed according to my invention, and Fig. 2 is a top plan view thereof.

Referring to said drawings, E is a vessel closed at the top, so that its upper part F serves as a reservoir for oxygen. At the side of the vessel there is a column G, which is open at the top and of such height that a column of water in it will balance the pressure of oxygen in F. Partition H extends down near to the bottom of the vessel and is preferably inclined inwardly, as shown, so as to lessen the splashing of water in the vessel and to prevent the escape of oxygen from the vessel if the spout G should be casually tilted upward. The vessel may be filled with water until it rises above the end of partition H. Oxygen may then be put in the chamber F through the valve-opening in the top thereof, and then additional water can be placed in the vessel E, the water partially compressing the oxygen in the chamber F, more or less, according to the height of the water in the column G. As the vessel is carried the oxygen is absorbed by the water, thus exposing to the air the amount of oxygen that is withdrawn therefrom by the fish.

Having thus described the nature of this invention and the best means I know for carrying the same into practical effect, I claim—

1. A vessel for transporting fish, having its upper part charged with oxygen, and having a side column and partition substantially as described.

2. In an apparatus for preserving fish alive during transport, the combination of a water-chamber, with an oxygen-chamber containing free or substantially uncompressed oxygen which is always in contact with the water, and said chambers being so located in reference to each other that the oxygen is trapped in its chamber by the water and is absorbed by the water in contact therewith, especially when agitated during transport of the apparatus.

In testimony whereof I have signed my name to this specification, in the presence of two subscribing witnesses, this 13th day of December, A. D. 1897.

FRANCIS G. RICHMOND.

Witnesses:
 JNO. P. M. MILLARD,
 FRED C. HARRIS.